US012748817B2

(12) United States Patent
Chrysanthou

(10) Patent No.: US 12,748,817 B2

(45) **Date of Patent: *Sep. 29, 2026**

(54) SYSTEMS AND METHODS FOR AUTOMATICALLY GENERATING A WEBSITE AND PROVIDING CUSTOMER SERVICE USING GENERATIVE ARTIFICIAL INTELLIGENCE

(71) Applicant: Sav.com, LLC, Chicago, IL (US)

(72) Inventor: Anthos Chrysanthou, Chicago, IL (US)

(73) Assignee: Sav.com, LLC, Chicago, IL (US)

( * ) Notice: Subject to any disclaimer, the term of this patent is extended or adjusted under 35 U.S.C. 154(b) by 372 days.

This patent is subject to a terminal disclaimer.

(21) Appl. No.: 18/656,686

(22) Filed: May 7, 2024

(65) Prior Publication Data

US 2024/0289411 A1 Aug. 29, 2024

Related U.S. Application Data

(63) Continuation-in-part of application No. 17/994,514, filed on Nov. 28, 2022, now Pat. No. 12,008,064.

(51) Int. Cl.

| | |
|---|---|
| ***G06F 16/958*** | (2019.01) |
| ***G06F 16/951*** | (2019.01) |
| ***G06F 40/186*** | (2020.01) |
| ***G06F 40/279*** | (2020.01) |
| ***G06Q 30/015*** | (2023.01) |
| ***G06Q 30/0241*** | (2023.01) |
| ***G06Q 30/0601*** | (2023.01) |
| ***H04L 12/18*** | (2006.01) |

(52) U.S. Cl.

CPC .......... *G06F 16/958* (2019.01); *G06F 16/951* (2019.01); *G06F 40/186* (2020.01); *G06F 40/279* (2020.01); *G06Q 30/015* (2023.01); *G06Q 30/0276* (2013.01); *G06Q 30/06444* (2025.08); *H04L 12/1813* (2013.01)

(58) Field of Classification Search

CPC .... G06F 16/958; G06F 16/951; G06F 40/186; G06F 40/279; G06Q 30/015; G06Q 30/0276; G06Q 30/06444; H04L 12/1813

See application file for complete search history.

(56) References Cited

U.S. PATENT DOCUMENTS

| | | | |
|---|---|---|---|
| 6,442,606 | B1 | 8/2002 | Subbaroyan et al. |
| 8,738,466 | B1 | 5/2014 | Kirby |
| 11,023,554 | B1 | 6/2021 | Miller et al. |
| 11,176,210 | B1 | 11/2021 | Miller et al. |
| 11,720,903 | B1 | 8/2023 | Henryson et al. |
| 2013/0159270 | A1 | 6/2013 | Urmy et al. |
| 2014/0189490 | A1 | 7/2014 | Ahmed et al. |
| 2016/0224991 | A1 | 8/2016 | Mukherjee et al. |
| 2017/0193367 | A1 | 7/2017 | Miikkulainen et al. |
| 2017/0316065 | A1 | 11/2017 | Fourney et al. |
| 2018/0373799 | A1 | 12/2018 | Koren et al. |
| 2020/0380060 | A1 | 12/2020 | Cohen et al. |
| 2021/0117484 | A1 | 4/2021 | Sollami |
| 2021/0390401 | A1 | 12/2021 | Brooks et al. |
| 2023/0014465 | A1 | 1/2023 | Sheng et al. |
| 2023/0051241 | A1 | 2/2023 | Jagadeeswaran et al. |
| 2023/0281695 | A1 | 9/2023 | Freed et al. |

*Primary Examiner* — Ting Z Lee

(57) ABSTRACT

The invention generally relates to systems and methods for automatically generating websites and providing customer service using generative artificial intelligence that requires minimal user input, and which does not require the technical skills and expertise that is traditionally needed to develop websites.

20 Claims, 6 Drawing Sheets

SYSTEMS AND METHODS FOR AUTOMATICALLY GENERATING A WEBSITE AND PROVIDING CUSTOMER SERVICE USING GENERATIVE ARTIFICIAL INTELLIGENCE

BACKGROUND

Field of the Invention

The present invention generally relates to systems and methods for automatically generating a website and related assets using generative artificial intelligence with minimal user input.

Description of Related Art

The past several decades have seen an explosive growth of the Internet. The Internet is built around a network of server computers, which exchange requests and data with each other using the hypertext transfer protocol. The Internet has become one of the most prominent, if not the most prominent, channel for individuals, businesses, and organizations to express their views, promote their goods and services, and otherwise publicize information about their offerings and activities.

Conventionally, creating websites has been a manually intensive process requiring hand-coding of source code for every aspect of website development, from designing the structure and layout, selecting fonts and color schemes, and inserting content such as text, images, videos, and hyperlinks. For the average Internet user wishing to develop a website, these tasks can be overwhelming, costly, and extremely time consuming.

In recent years, various commercial website builders have been developed which attempt to offer coding-free platforms that rely on rudimentary templates. For example, companies such as Wix®, GoDaddy®, Squarespace®, Weebly®, WordPress®, and others offer such website builders. Despite appealing to users with little or no website development experience, these platforms have significant drawbacks. For example, they typically require a significant amount of user input in order for the website to be truly customized and tailored to the user's business or organization. In addition, these website builders tend to offer basic templates which do not allow for much customization, such that a user's website ends up appearing similar in layout, structure, colors, fonts, etc. to websites of other users who may utilize the same template.

Furthermore, these website builders do not include mechanisms to learn from user feedback during a website building process, in order to leverage artificial intelligence over time to improve the efficiency, speed, and accuracy of generating future websites.

The present invention provides improved systems and methods for generating websites using artificial intelligence that overcomes the aforementioned challenges of conventional website development, as well as which overcomes the drawbacks of currently available website builders, regardless of the level of technical skill or expertise of the user.

SUMMARY

In one embodiment, the present invention relates to a system for automatically generating a website and providing conversational chat-based customer service, comprising: a server including one or more processors; a memory coupled to the server, the memory storing instructions that, when executed by the one or more processors, cause the system to perform: receiving a description of a business or an organization from a user computing device by an intake engine coupled to the server, wherein the description is limited to no more than 200 characters; analyzing the description by a natural language processing engine coupled to the server to extract a plurality of terms from the description; for each of the plurality of terms, determining if the term is stored in a corpus coupled to the memory, wherein if the term is stored in the corpus, then the term is placed in a key term list; searching the Internet by an Internet scanning engine coupled to the server to identify websites that include at least 75% of the terms in the key term list, wherein the Internet scanning engine identifies websites by searching for the terms in the key term list in a source code of the websites; ranking the identified websites using a traffic data algorithm, wherein websites having higher traffic are assigned a higher rank; generating the website by a template generation engine coupled to the server, the website generated based on a weighted analysis of the ranked identified websites; inserting copy and multimedia related to content on the ranked identified websites into the website by a content generation engine coupled to the server; and inserting a chat feature into the website, wherein a large language model ("LLM") engine coupled to the server generates responses to queries entered into the chat feature.

In another embodiment, the prese invention related to a system for automatically generating a website and providing conversational chat-based customer service, comprising: a server including one or more processors; a memory coupled to the server, the memory storing instructions that, when executed by the one or more processors, cause the system to perform: receiving a description of a business or an organization from a user computing device by an intake engine coupled to the server, wherein the description is limited to 200 characters; analyzing the description by a natural language processing engine coupled to the server to extract a plurality of terms from the description; for each of the plurality of terms, determining if the term is stored in a corpus coupled to the memory, wherein if the term is stored in the corpus, then the term is placed in a key term list; searching the Internet by an Internet scanning engine coupled to the server to identify websites that include a threshold percentage of the terms in the key term list, wherein the Internet scanning engine identifies websites by searching for the terms in the key term list in a source code of the websites; ranking the identified websites using a traffic data algorithm, wherein websites having higher traffic are assigned a higher rank; generating the website by a template generation engine coupled to the server, the website generated based on a weighted analysis of the ranked identified websites; inserting copy and multimedia related to content on the ranked identified websites into the website by a content generation engine coupled to the server; and inserting a chat feature into the website, wherein a large language model ("LLM") engine coupled to the server generates responses to queries entered into the chat feature by the user computing device, wherein the responses are generated based at least in part on an interaction by the user computing device with the website.

In yet another embodiment, the present invention relates to a system for automatically generating a website and providing conversational chat-based customer service, comprising: a server including one or more processors; a memory coupled to the server, the memory storing instructions that, when executed by the one or more processors, cause the system to perform: receiving a description of a business or an organization from a user computing device by an intake engine coupled to the server, wherein the description is limited to 200 characters; analyzing the description by a natural language processing engine coupled to the server to extract a plurality of terms from the description; for each of the plurality of terms, determining if the term is stored in a corpus coupled to the memory, wherein if the term is stored in the corpus, then the term is placed in a key term list; searching the Internet by an Internet scanning engine coupled to the server to identify websites that include a threshold percentage of the terms in the key term list, wherein the Internet scanning engine identifies websites by searching for the terms in the key term list in a ource code of the websites; ranking the identified websites using a traffic data algorithm, wherein websites having higher traffic are assigned a higher rank; generating the website by a template generation engine coupled to the server, the website generated based on a weighted analysis of the ranked identified websites; inserting copy and multimedia related to content on the ranked identified websites into the website by a content generation engine coupled to the server; and inserting a chat feature into the website, wherein a large language model ("LLM") engine coupled to the server generates responses to queries entered into the chat feature by a user computing device, wherein the responses are generated based at least in part on a navigation history of the user computing device on the website.

BRIEF DESCRIPTION OF THE DRAWINGS

These and other embodiments of the disclosure will be discussed with reference to the following exemplary and non-limiting illustrations, in which like elements are numbered similarly, and where.

DEFINITIONS

Figure 1:
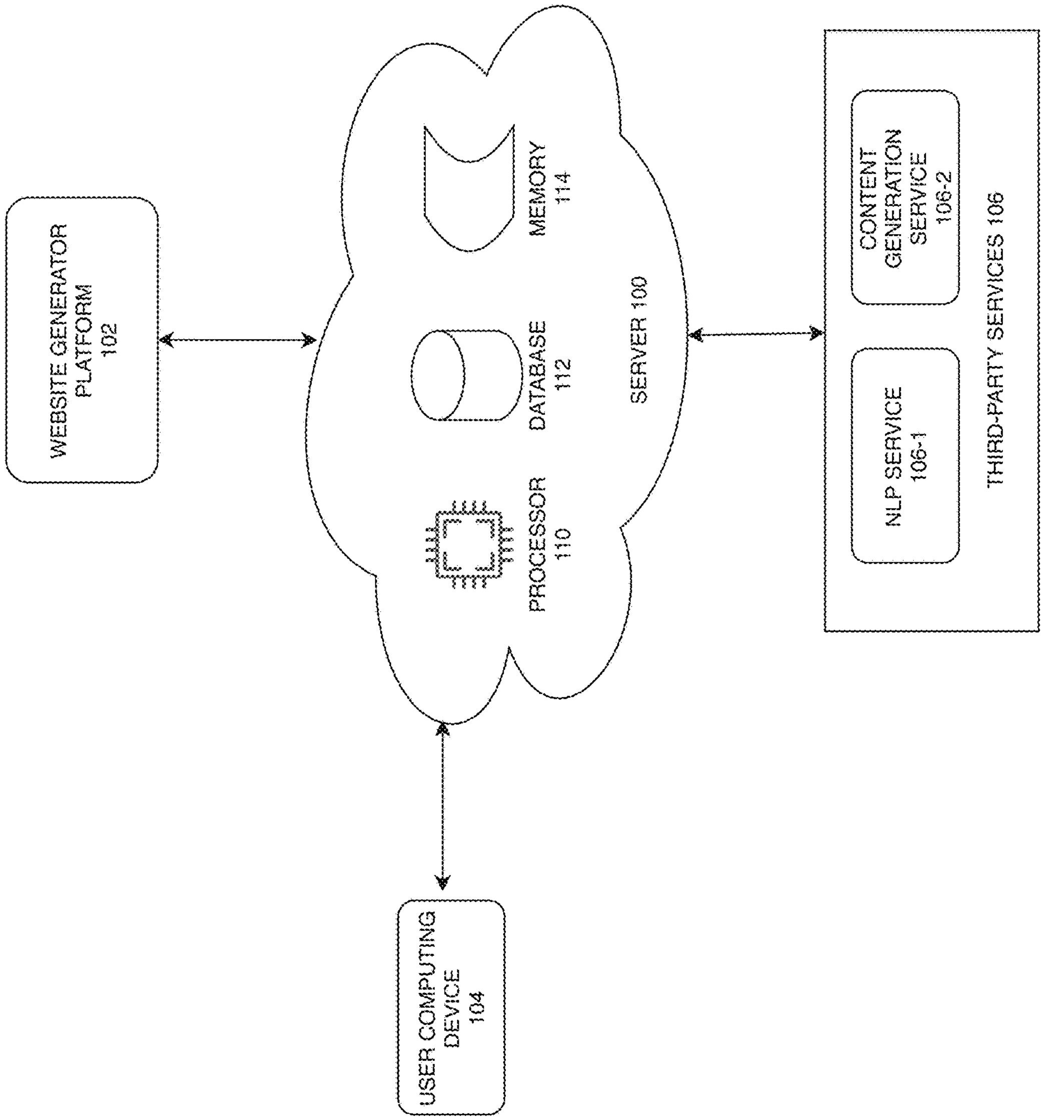
FIG. 1 shows an exemplary block diagram of a network architecture utilized by a website generator platform, according to an embodiment of the present invention.

The following definitions are meant to aid in the description and understanding of the defined terms in the context of the present invention. The definitions are not meant to limit these terms to less than is described throughout this application. Such definitions are meant to encompass grammatical equivalents.

As used herein, the term "website" can refer to, for example, a single webpage, a group of linked or related webpages, a landing page, a homepage, an e-commerce store, a social media page, a social media post, an Internet-accessible location containing content, a virtual reality, augmented reality, or mixed reality location containing content (included content located in metaverses), streaming and/or interactive video and television content, and any combination thereof, and the like.

As used herein, the term "content" means any form of electronic or digital content, media, compilations, files, streaming data, and the like. This includes, but is not limited to, video, images, animations, audio, slideshows, text, web- or hyper-links, and any combination thereof, and the like.

As used herein, the term "social media network" can refer to, for example, any computer platform, website, computer application, and the like, that that indicates relationships between individuals, businesses, communities, and/or groups, such as entities who share, post, comment on, and distribute information related to interests, activities, backgrounds, job opportunities, and/or real-life connections, and can include, but is not limited to, Facebook®, Instagram®, Twitter®, Snap®, LinkedIn®, TikTok®, YouTube®, and the like, and further refers to any platform, ecosystem, network, or computing environment that allows users to connect with each other, whether in a conventional, virtual reality, augmented reality, or mixed reality environment, including within metaverses.

As used herein, the terms "publish", "published", and "publishing" can refer to, for example, distributing, placing, displaying, streaming, posting, sharing, tweeting, and otherwise making websites and/or content available for displaying, viewing, or downloading onto the Internet, social media networks, and/or virtual reality, augmented reality, or mixed reality environments, including in metaverses.

As used herein, the terms "artificial intelligence" and "AI" can refer to, or can incorporate, for example, machine learning, deep-learning, supervised learning, unsupervised learning, semi-supervised learning, reinforced learning, fuzzy logic, neural networks, historical data and pattern analysis, and any combination thereof, and the like.

As used herein, the terms "generative artificial intelligence" and "generative AI" can refer to, or can incorporate, for example, a set of machine learning techniques that enable human-like creative tasks to be performed with the help of machine learning models. Such tasks include, but are not limited to, the creation of content such as source code, images, audio, video, multimedia, simulations, renderings, any combination thereof, and the like. Further, these terms can refer to large language models ("LLMs"), such as, for example, GPT (including ChatGPT, GPT-1, GPT-2, GPT-3, GPT-3.5, GPT-4), Gemini, PaLM, Llama, Cohere, Vicuna, Claude, Stable Beluga, StableLM, Coral, Falcon, MPT, Mixtral 8x7B, XGen-7B, Grok, ChatGLM, MOSS, and the like.

As used herein, the term "computing device" can refer to, for example, mobile phones, portable media players, portable digital assistants (PDAs), desktop computers, laptop computers, netbooks, smartphones, tablet computers, Internet-connected wearable devices, "smart" watches, virtual assistant devices and systems, any combination thereof, and the like.

As used herein, the term "engine" can refer to hardware components, such as servers, processors, distributed computing platforms, and the like, and software components, such as source code, packages, libraries, algorithms, any combination thereof, and the like.

As used herein, the term "network" can refer to, for example, the Internet, a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (i.e., personal area network (PAN), home area network (HAN), to name a couple of alternatives) a wireless network, a cellular network, a landline network, and/or a short-range connection network (i.e., such as Bluetooth, Zigbee, infrared, and the like). Networks can include enterprise private networks and virtual private networks.

DETAILED DESCRIPTION

It should be understood that aspects of the present invention are described herein with reference to the figures, which show illustrative embodiments. The illustrative embodiments herein are not necessarily intended to show all embodiments in accordance with the present invention, but rather are used to describe a few illustrative embodiments. Thus, aspects of the present invention are not intended to be construed narrowly in view of the illustrative embodiments. In addition, although the present invention is described with respect to its application for generating websites, it is understood that the present invention could be implemented in any setting where websites and digital content can be generated and shared, such as on the Internet and social media networks, and within virtual worlds, augmented and mixed reality environments, and streaming and/or interactive video and television platforms.

FIG. 1 shows an exemplary block diagram of a network architecture utilized by a website generator platform, according to an embodiment of the present invention. The network architecture includes a server 100, a website generator platform 102 coupled to the server 100 via a network connection, at least one user computing device 104 coupled to the server 100 via a network connection, and third-party services 106 (individually, services 106-1 and 106-2) coupled to the server 100 via a network connection.

The server 100 is intended to represent a computer system or network of computer systems, which can include or be implemented as a specific purpose computer system for carrying out the functionalities of the present invention. In general, the server 100 can include a processor 110, a database 112, and a memory 114, with a device such as a bus (not shown) coupling the processor 110 to the database 112 and the memory 114. The processor 110 can be, for example, a general-purpose central processing unit (CPU), such as a microprocessor, or a special-purpose processor, such as a microcontroller.

The memory 114 of the server 100 can include, by way of example but not limitation, random access memory (RAM), such as dynamic RAM (DRAM) and static RAM (SRAM). The memory 114 can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into the memory 114 by way of a bus coupled to non-volatile storage. Non-volatile storage can be local, remote, or distributed, but is optional because systems can be created with all applicable data available in the memory 114.

Software in the server 100 is typically stored in non-volatile storage, and can include, for example, operating system software and application software. For software to run, if necessary, it is moved to a computer-readable location appropriate for processing, and for illustrative purposes of the present invention, that location is referred to as memory 114. Even when software is moved to the memory 114 for execution, the processor 110 will typically make use of hardware registers to store values associated with the software, and a local cache that, ideally, serves to speed up execution. As used herein, software is assumed to be stored at an applicable known or convenient location (from non-volatile storage to hardware registers) where the software is referred to as "implemented in a computer-readable storage medium." The processor 110 is "configured to execute the software" when at least one value associated with the software is stored in the memory 114 readable by the processor 110.

In one example of operation, the server 100 can be controlled by operating system software, which is software that includes a file management system, such as a disk operating system. One example of operating system software is the family of operating systems known as Windows® from Microsoft Corporation, and their associated file management systems. Another example of operating system software with its associated file management system software is the Linux® operating system and its associated file management system. The file management system is typically stored in the non-volatile storage and causes the processor 110 to execute the various acts required by the operating system software to input and output data and to store data in the memory 114, including storing files in the database 112. In an embodiment, the database 112 can be in the form of a distributed ledger.

In an embodiment, the application software includes executable software that enables operation of the website generator platform 102, and as well as the functionality of its various engines, data stores, application programming interfaces (APIs), and other components.

The bus of the server 100 can couple the processor 110 to at least one network interface (not shown). The network interface can be for input and/or output (I/O) devices, modems, or networks. Modems can include, by way of example but not limitation, an analog modem, an IDSN modem, a cable modem, and other modems. The network interface can include, by way of example but not limitation, a token ring interface, a satellite transmission interface, a direct cable connection, or other network interface for coupling the server 100 to the user computing device 104, as well as for coupling the server 100 to the various third-party services 106.

The server 100 can be compatible with, or implemented as part of, a cloud-based computing system. A cloud-based computing system is a system that provides virtualized computing resources, software and/or data to client devices, such as provided by Amazon Web Services® and the like. The computing resources, software and/or data can be virtualized by maintaining centralized services and resources that the server 100 can access over a network interface. As used herein, a cloud-based computing system can refer to an on-demand cloud-computing platform, a "serverless" cloud-computing platform (such as, for example, the Amazon Web Services® Lambda platform), and/or another cloud-computing platform. The cloud-based computing system can require a subscription for services, or it can use a utility pricing model. In an embodiment, users can access the engines, data, and components described herein of the cloud-based computing system through a web browser, software application, or other container application located on their computing device.

All or portions of the software and/or functionalities of the website generator platform 102 can be distributed across multiple computing devices and need not be restricted to just the server 100. In this embodiment, the server 100 can execute functionalities and/or engines that users access through a web browser, software application, or container application without having the functionalities and/or engines installed locally on their computing devices.

In another embodiment, functionality of the website generator platform 102 can be performed by one or more servers (i.e., a cloud-based computing systems, edge servers, and the like) and/or other computing devices, such as software installed and executing on the user computing device 104.

The network connections (indicated by arrows between the server 100 and the website generator platform 102, the user computing device 104, and the third-party services 106) can be part of an applicable communications network, such as the Internet or an infrastructure network.

In an embodiment, a user operates the user computing device 104 that is communicatively coupled to the server 100 in order to utilize the website generator platform 102. The user computing device 104 communicates with the server 100 via a network connection. In an embodiment, the user computing device 104 can be any computing device capable of connectivity to the server 100 via a network connection. In an embodiment, the user computing device 104 includes or can access software, such as a smartphone application, distributed application, a web-based application, a cloud-based application, and the like (hereinafter, collectively, the "Sav.com Software"), which allows users to access and utilize the website generator platform 102. In an embodiment, the Sav.com Software provides a display on the user computing device 104 that allows a robust and interactive graphical user interface ("GUI") for the website generator platform 102 to be accessed and manipulated by the user.

In an embodiment, the third-party services 106 are communicatively coupled to the server 100 via a network. The server 100 may utilize an API which allows the server 100 to communicate with each third-party service 106. Each third-party service 106 may require the server 100 to utilize a different API in order to communicate with, and receive data from, that respective the third-party service 106. In another embodiment, the server 100 may utilize alternatives to APIs, such as, for example, webhooks, remote procedure calls, and the like, to communicate with, and receive data from, each of the third-party services 106.

Figure 2:
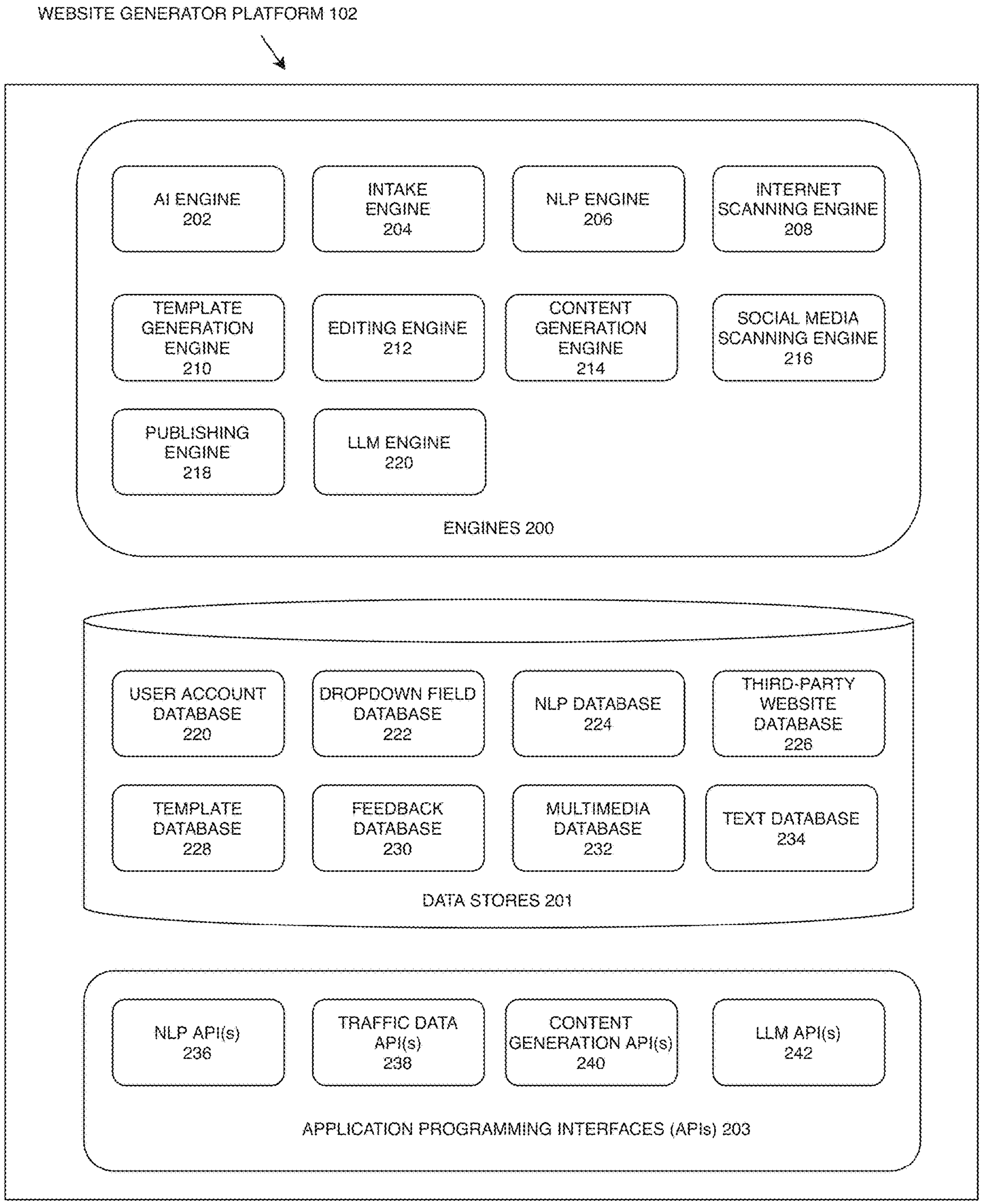
FIG. 2 shows an exemplary component diagram of the website generator platform, according to an embodiment of the present invention.

FIG. 2 shows an exemplary component diagram of the website generator platform 102, according to an embodiment of the present invention. In an embodiment, the website generator platform 102 includes engines 200, data stores 201, and APIs 203.

In an embodiment, users access and use the website generator platform 102 and all the functionality provided by the engines 201 and data stores 203 as described herein via the Sav.com Software using their user computing device 104.

In an embodiment, the website generator platform 102 includes an artificial intelligence engine 202 that is communicatively coupled to the various engines 200, datastores 201, and APIs 203. The artificial intelligence engine 202 can analyze data related to, for example, generated website templates, generated websites, third-party websites, and user feedback (i.e., approvals, rejections, and edits), over time to generate future website templates and websites more efficiently, quickly, and accurately.

In an embodiment, the website generator platform 102 includes an intake engine 204. The intake engine 204 processes a description of a business or organization input by the user via the user computing device 104. In an embodiment, the description can be limited to one to five sentences, and in a preferred embodiment, the description is limited to two sentences. In another embodiment, the description is limited to 3 words to 50 words, and in an preferred embodiment, the description is limited to 30 words. In yet another embodiment, the description is limited to 50 characters to 300 characters, and in a preferred embodiment, the description is limited to 200 characters. For example, the description can state "Coffee shop in the South Loop of Chicago", "Accounting firm in Atlanta", "High school football team in Los Angeles", "Birthday party supply store in New York City", and the like.

In an embodiment, the intake engine 204 displays a text input field on the user computing device 104 that allows the user to input the description. In an embodiment, the text input field can be limited to a maximum number of characters, words, and/or sentences. For example, the text input field can prevent the user from entering additional characters once the maximum number has been reached.

In an embodiment, the text input field can require the user to enter a minimum number of characters, words, and/or sentences. For example, the text input field can prevent the user from submitting the description until the minimum number has been reached.

In another embodiment, the intake engine 204 can automatically suggest words or phrases as the user is typing the description. For example, if the user types the word "coffee", the intake engine 204 can suggest the next words and phrases "shop", "and tea", "roaster", "grower", etc. Likewise, if the user types the word "accounting", the intake engine 204 can suggest the next words and phrases "firm", "and tax", "services", "CPA", etc.

Once the user enters the description into the text input field, the intake engine 204 creates a description text string from the entered description.

In another embodiment, the intake engine 204 can detect the geographic location of the user computing device 104, and can suggest a geographic location for the description. For example, if the user types the word "Coffee shop", and the intake engine 204 detects the geographic location of the user computing device 104 to be in Chicago, the intake engine 204 can suggest the next phrase "in Chicago".

In an embodiment, the intake engine 204 can detect the geographic location of the user computing device 104 using the internet protocol (I.P.) address of the user computing device 104, by using an address provided by the user and stored in a user account database 220 as part of a user registration process, and/or by using an address provided by the user pursuant to a prompt displayed by the intake engine 204.

In yet another embodiment, the user computing device 104 can receive the description from the user via spoken commands. For example, the user can speak the description into the user computing device 104, where the description is captured using a microphone coupled to the user computing device, and the captured audio description is then processed by the intake engine 204. In an embodiment, the intake engine 204 can utilize, for example, voice activity detection, speech recognition, speech-to-text technology, and the like, to convert the captured audio description to a description text string.

In yet another embodiment, instead of entering a sentence-based description, the user can simply enter a series of keywords that describe their business or organization. For example, for a coffee shop in Chicago, the user can simply enter the words "coffee", "shop" and "Chicago", and the intake engine 204 automatically creates a description text string with from these words.

In yet another embodiment, instead of, or in addition to, the text input field, the intake engine 204 can display a series of dropdown fields on the user computing device 104. The dropdown fields can be pre-populated with various business categories, organization categories, and the like. For example, business categories can include options such as food and beverage, professional services, landscaping services, beauty services, etc., while organization categories can include options such as religious group, athletic team, musical band, educational institution, etc.

In this embodiment, the dropdown fields can be populated and/or displayed based on the user's selections. For example, the first dropdown field can include two options—(1) Business or (2) Non-business Organization. Depending on the selection, the intake engine 204 can then display a second dropown field which includes options for business categories, or options for non-business organizations.

The number of sequential dropdown fields is not limited, and additional dropdown fields based on user selections can be displayed by the intake engine 204. For example, if the user selects "Business" in the first dropdown field, and then "Food and Beverage" in the second dropdown field, the intake engine 204 can display a third dropdown field which includes various food and beverage-related options, such as, for example, "fast food", "catering", "dine-in", "bar", and/or various cuisine types, such as, for example, "Italian", "Chinese", "Japanese", "Mexican", "Caribbean", "Indian", etc.

In an embodiment, the options used to populate the dropdown fields can be stored in a dropdown field database 222. If there is not a suitable option in a particular dropdown field, the user can add an option. For example, in the previous scenario, if the food and beverage-related options do not include a user's particular cuisine type, they can add their cuisine type, and it will be added to the dropdown field database 222 by the intake engine 204. The added cuisine type will now appear in the dropdown field for various food and beverage-related options the next time a user reaches this dropdown field.

In this embodiment, a dropdown field with various location options can be displayed by the intake engine 204. For example, the dropdown field can include a list of all fifty United States, and upon selection of a state, the intake engine 204 can display a second dropdown field with options for each town or city within the selected state. In an embodiment, a third dropdown field can be displayed by the intake engine 204 with options for various neighborhoods or areas within a selected town or city.

Once the user has selected from all of the relevant displayed dropdown fields, the intake engine 204 creates a description text string comprising each option selected from each dropdown field.

Once the description has been fully entered by the user and converted to the description text string by the intake engine 204, the description text string is processed by a natural language processing (NLP) engine 206. In an embodiment, the NLP engine 206 processes the description text string to extract key terms. For example, the key terms can include, but are not limited to, business types, organization types, locations, and other adjectives, descriptors, and identifiers.

In an embodiment, the NLP engine 206 is communicatively coupled to a NLP database 224 which contains a key term corpus consisting of popular, commonly used, and/or generic key terms. The NLP engine 206 can extract words from the description text string, and compare each extracted word with the key term corpus stored in the NLP database 224. If an extracted word is found in the key term corpus, then the NLP engine 206 marks the extracted word as a key term. If, however, the extracted word is not found in the key term corpus, then the NLP engine does not mark the extracted word as a key term.

Once the NLP engine 206 extracts the key terms from the description text string, these key terms are displayed to the user computing device 104 as suggestions for the user to review. In an embodiment, the user can approve, remove, or edit any of the suggested key terms. For example, if the user agrees with a particular suggested key term, then the user can approve that key term, and it is added to an approved key term list by the NLP engine 206. If, however, the user does not agree that a particular suggested key term is relevant to their business or organization, then the user can remove that suggested key term and it is not added to the approved key term list by the NLP engine 206.

In an embodiment, the user can also edit a particular suggested key term. For example, if a particular suggested key term may be relevant, but is not ideal or fully accurate for the user's business or organization, the user can edit the suggested key term via the user computing device 104, and the edited key term is added to the approved key term list by the NLP engine 206.

In an embodiment, if a user removes a suggested key term, or edits a suggested key term, these actions are fed back to the NLP database 224 by the NLP engine 206. The key term corpus stored in the NLP database 224 is continually updated by the NLP engine 206 such that the key term corpus is added to and/or modified over time, and analyzed by the artificial intelligence engine 202.

In another embodiment, the website generator platform 102 is coupled to at least one third-party NLP service 106-1 using at least one NLP API 236. In this embodiment, the functions described here with regards to the NLP engine 206 can be wholly or partially performed by the at least one third-party NLP service 106-1.

Once the approved key term list is finalized by the NLP engine 206, the approved key term list is utilized by an Internet scanning engine 208 to search the Internet for third-party websites which are relevant to the terms in the approved key term list (and thus, relevant to the user's business or organization). For example, if the approved key term list includes the terms "coffee shop" and "Chicago", the Internet scanning engine 208 searches the Internet for websites related to coffee shops in Chicago.

In an embodiment, the Internet scanning engine 208 performs keyword-based searching against text, copy, content, headers, descriptors, and tags of third-party websites to identify websites relevant to the user's business or organization. In addition, the Internet scanning engine 208 searches source code, such as HTML code and metadata, of third-party websites to identify relevant websites matching the approved key term list.

In an embodiment, the Internet scanning engine 208 limits its search of the approved key term list to a particular geographic location. The geographic location could be based on a key term in the approved key term list, or alternatively, automatically determined by the Internet scanning engine 208 using the I.P. address of the user computing device 104 or by using an address provided by the user. Alternatively, the Internet scanning engine 208 can prompt the user to enter a geographic location prior to commencing its Internet search.

In this embodiment, the Internet scanning engine 208 will only review third-party websites which relate to the geographic location relevant to the user's business or organization. For example, if the approved key term list only includes the term "coffee shop", and if Internet scanning engine 208 determines the particular geographic location is the city of Chicago, then only third-party websites related to coffee shops, bars, purveyors, etc. mentioning, having a contact address, or otherwise referencing Chicago are analyzed by the Internet scanning engine 208.

In an embodiment, the Internet scanning engine 208 ranks each potentially relevant third-party website using at least one of a matching algorithm and a traffic data algorithm, so that a weighted analysis can be performed.

In an embodiment, the Internet scanning engine 208 can utilize a matching algorithm to determine how closely a particular third-party website matches the users' business or organization. For example, if a threshold percentage of terms in the approved key term list appear on the third-party website or its source code, then it may be deemed to be a potentially relevant website. In an embodiment, the threshold percentage can be 50% to 100%, and in a preferred embodiment, the threshold percentage is 75%.

Next, the Internet scanning engine 208 can utilize a traffic data algorithm which leverages at least one Internet traffic data API 238 to determine the popularity of third-party websites. For example, if the matching algorithm determines that a third-party website may be potentially relevant, but the Internet traffic for this particular website is relatively low, the Internet scanning engine 208, can assign a low rank to the third-party website.

However, if the Internet traffic for this particular website is relatively high, the Internet scanning engine 208 can assign a higher rank to the third-party website.

In an embodiment, the traffic data algorithm can determine the average traffic for third-party websites, such as the average daily traffic, average monthly traffic, and/or the average yearly traffic, using at least one Internet traffic data API 238. Based on this determined average traffic value, the traffic data algorithm can determine if the traffic for a particular third-party website is relatively low, comparable, or high.

In an embodiment, the Internet scanning engine 208 can utilize the traffic data algorithm prior to the matching algorithm, or can utilize the traffic data algorithm and matching algorithm concurrently. In another embodiment, the Internet scanning engine 208 can utilize only the matching algorithm or only the traffic data algorithm.

In an embodiment, once the Internet scanning engine 208 identifies relevant third-party websites, each identified website is ranked based on the results of the matching algorithm and/or traffic data algorithm.

In an embodiment, the Internet scanning engine 208 is communicatively coupled to a third-party website database 226. The Internet scanning engine 208 can store the results of the matching algorithm for each approved key term list in the third-party website database 226. In addition, the Internet scanning engine 208 can store the results of the traffic data algorithm for each relevant third-party website in the third-party website database 226. The third-party website database 226 can be continually updated over time, and analyzed by the artificial intelligence engine 202, such that the Internet scanning engine 208 can leverage the third-party website database 226 for future searches when similar business and organizations are being searched for.

Once the Internet scanning engine 208 identifies the relevant third-party websites, a template generation engine 210 analyzes each relevant third-party website for various template information, such as, but not limited to:

a. The types of pages on the relevant third-party website, such as, for example, "About", "Products", "Services", "Contact", "Online Ordering", "Frequently Asked Questions", "Privacy Policy", "Disclaimer", and the like.
b. The type of content on each page of the relevant third-party website, such as, for example, text, copy, images, video, animations, other multimedia, forms (i.e., text input fields, button selectors, dropdown fields, etc.), chatbots, and the like.
c. The context of the content of the relevant third-party website, such as, for example, a theme, product or service information, operating hours and schedule, menus, customer reviews, background, and history, and the like.
d. What the content depicts, such as, for example, product images and videos, customer images and videos, instructional content, educational content, informational content, and the like.
e. The color scheme and/or palette of the relevant third-party website, such as, for example, the background color(s), header color(s), font color(s), hyperlink and mouseover color(s), and the like.
f. The font(s) and font size(s) used on the relevant third-party website, such as, for example, various heading fonts, copy fonts, footer fonts, hyperlink fonts, and the like.
g. The structure and layout of elements on the relevant third-party website, such as, for example, the location of the fold, use of frames, header and footer locations, menu and menu bar locations, social media link locations, widget locations, and the like.
h. The presence or absence of social media content on the relevant third-party website, such as, for example, widgets displaying linked social media feeds and/or posts, the specific social media networks linked from the third-party website, and the like.

In an embodiment, if the Internet scanning engine 208 has ranked each of the relevant third-party websites, then the template information for each of these third-party websites is weighted by the template generation engine 210. For example, if a particular third-party website has a rank of 100%, indicating that it is extremely relevant to the user's business or organization, and that it has a relatively high Internet traffic, the template information determined from this particular website is given a higher weight by the template generation engine 210. This means that a website template generated by the template generation engine 210 will more closely resemble this particular website than a website with a lower ranking.

In an embodiment, the template generation engine 210 can generate a website template based on the aggregate weighted template information from the relevant third-party websites. The template generation engine 210 creates a website template taking into account at least one of: the types of pages contained on the identified websites, the types of content included on the identified websites, the context of the content on the identified websites, what the content on the identified websites depict, the color schemes of the identified websites, the font and font sizes utilized on the identified websites, the structure and layout of elements on the identified websites, and the social media information utilized on the identified websites.

In an embodiment, the template generation engine 210 is communicatively coupled to a template database 228. The template generation engine 210 can select a pre-defined template from the template database 228 which most closely matches the aggregate weighted template information. In this embodiment, the template generation engine 210 can edit or modify the template to better match the aggregate weighted template information more closely. The modified pre-defined template is then stored in the template database 228 by the template generation engine 210. In an embodiment, the template database 228 is continually updated by the template generation engine 210, such that the pre-defined templates are added to and/or modified over time, and analyzed by the artificial intelligence engine 202.

In an embodiment, the template generation engine 210 displays the website template on the user computing device 104 for the user to review. The user can reject the website template, edit the website template, or approve the website template. For example, if the user is not satisfied with the website template, the user can reject the website template, and the template generation engine 210 can generate another website template which is subsequently displayed on the user computing device 104 for the user to review.

In an embodiment, if the user rejects a website template, the template generation engine 210 can prompt the user to provide feedback about why the website template was rejected. For example, the prompt can include a text input field, or pre-defined questions which the user can respond to using pre-defined answers. In the latter embodiment, the pre-defined questions can have pre-defined answers in the form of radio buttons or dropdown fields. For example, if the user rejects a website template, the template generation engine 210 can prompt a number of questions, such as, for example: "Do you like the color scheme?", "Do you like the font?", "Do you like the layout?", and the like, and the pre-defined answers can be, for example, "Yes", "No", "Somewhat", and the like. In another embodiment, the user can be prompted to provide feedback based on a scale of one to ten for various aspects of the website template.

In an embodiment, the template generation engine 210 can then generate another website template by considering the user feedback.

In an embodiment, the template generation engine 210 is communicatively coupled to a feedback database 232. The template generation engine 210 can store the user feedback in the feedback database 232 along with a mapping or reference to the rejected website template.

In an embodiment, the user has the option to modify the website template. In this scenario, the template generation engine 210 can provide prompts to the user in order to understand what aspect(s) of the website template the user would like to edit, and subsequently guide the user through a series of steps to edit these particular aspect(s).

Alternatively, the template generation engine 210 can call a editing engine 212 which allows the user to manually edit the website template. In an embodiment, the editing engine 212 can be a what you see if what you get (WYSIWYG) editor, a drag-and-drop editor, a source code editor, and the like.

In yet another embodiment, the template generation engine 210 can generate multiple website templates, and provide each of these in a side-by-side on the user computing device 104 for the user to review and select.

Once the user approves a website template, the approved website template is processed by a content generation engine 214 to create a website. In an embodiment, the content generation engine 214 can generate various content for the website, such as, for example, images, videos, text, and copy.

In an embodiment, the content generation engine 214 is communicatively coupled to a multimedia database 232. The multimedia database 232 includes content such as, for example, images, videos, audio, animations, and the like. The content in the multimedia database 232 can be royalty free content, licensed content, or content which the user can purchase if desired.

In an embodiment, the content generation engine 214 can search the multimedia database 232 for multimedia content that matches the multimedia content found on the relevant third-party websites identified by the Internet scanning engine 208.

In an embodiment, the content generation engine 214 is also communicatively coupled to a text database 234. The text database 234 includes various text, titles, headings, calls to action, copy, disclaimers, policies, menus, and the like. The text content in the text database 234 can be royalty free text, licensed text, or text which the user can purchase if desired. The content generation engine 214 searches the text database 234 for text content that matches the text content found on the relevant third-party websites identified by the Internet scanning engine 208.

In an embodiment, the content generation engine 214 searches the Internet for multimedia content and text content which is similar to, but not identical to, the multimedia content and text content found on the relevant third-party websites identified by the Internet scanning engine 208.

In yet another embodiment, the content generation engine 214 can generate and/or render multimedia content and text content to be similar to multimedia content and text content found on the third-party relevant websites identified by the Internet scanning engine 208.

Once the content generation engine 214 inserts the relevant multimedia content and text content into the website, a social media scanning engine 216 searches various social media networks to identify social media content and profiles relevant to the user's business or organization. In an embodiment, the social media scanning engine 216 identifies relevant social media content and profiles matching the approved key term list, or including key terms in the approved key term list, as described herein.

In an embodiment, the social media scanning engine 216 identifies social media content such as operating hours and schedule, menus, pricing information, customer reviews, background, and history, and the like, as well as which social media network(s) are primarily utilized by relevant third-party websites and social media profiles which match the user's business or organization. In an embodiment, the social media scanning engine 216 inserts the identified social media content into the website template.

In another embodiment, the website generator platform 102 is coupled to at least one third-party content generation service 106-2 using at least one content generation API 240. In this embodiment, the functions described here with regards to the content engine 214 can be wholly or partially performed by the at least one third-party content generation service 106-2.

In an embodiment, the NLP server 106-1 and/or the content generation service 106-2 can utilize a LLM API 242, such as the OpenAI API provided by OpenAI, Inc. In another embodiment, the website generator platform 102 leverages the LLM API 242 to access an external LLM, which can be either a public LLM or a private third-party LLM.

In another embodiment, the social media scanning engine 216 displays the identified social media content on the user computing device 104, and allows the user to select which social media content it would like to include on the website template.

Once the multimedia content, text content, and/or social media content has been inserted into website template, the content generation engine 214 creates a website. In an embodiment, a publishing engine 218 displays the website on the user computing device 104. The user can reject the website, edit the website, or approve the website. For example, if the user is not satisfied with the website, the user can reject the website, and the publishing engine 210 can prompt a number of questions, such as, for example, "Do you like the color scheme?", "Do you like the font?", "Do you like the layout?", and the like, and the pre-defined answers can be, for example, "Yes", "No", "Somewhat", and the like. In another embodiment, the user can be prompted to provide feedback based on a scale of one to ten for various aspects of the website.

Based on the user feedback, the template generation engine 210 and/or the content generation engine 214 can generate another website template or another website by considering the user feedback.

In an embodiment, the publishing engine 218 is communicatively coupled to the feedback database 232. The publishing engine 218 can store the user feedback in the feedback database 232 along with a mapping or reference to the rejected website.

In an embodiment, the user has the option to modify the website. In this scenario, the publishing engine 218 can provide prompts to the user computing device 104 in order to understand what aspect(s) of the website the user would like to edit, and subsequently guide the user through a series of steps to edit these particular aspect(s).

Alternatively, the publishing engine 218 can call the editing engine 212 which allows the user to manually edit the website and/or the website template.

In yet another embodiment, the content generation engine 214 can generate multiple websites, and provide each of these websites in a side-by-side fashion on the user computing device 104 for the user to review and select.

In an embodiment, if the user approves the website, the publishing engine 218 publishes the website onto the Internet. In an embodiment, the publishing engine 218 publishes the website onto a domain name hosted by the Sav.com Software, or hosted by a third-party service. In another embodiment, the hyperlinks to the website are also published on various social media networks.

In another embodiment, the artificial intelligence engine 202 employs a generative artificial intelligence, or generative AI, model, such as a LLM. In an embodiment, the artificial intelligence engine 202 is communicatively coupled to the LLM engine 220, which can be a server, processor, computing device, or distributed service that executes the LLM. The LLM engine 220 continuously learns from and analyzes Internet content, such as on third-party websites, blogs, advertisements, and the like, as well social media content, such as on social media feeds, posts, and the like. This learned content is leveraged by the LLM engine 220 to perform the various functions described herein of the website generator platform 102.

In an embodiment, the LLM engine 220 utilizes a private LLM which provides data privacy and protection, and which minimizes the exposure of user input and data, such as descriptions, during both the LLM training and inference phases. The private LLM is trained on data that is not publicly available, and which may be stored within the datastores 201, versus wholly on the Internet or on social media platforms. The private LLM can be an internal LLM that is protected within the computing environment of the server 100, and which is not accessible freely through the Internet, or to external devices, users, or computing devices without permission or credentials.

In an embodiment, the LLM engine 220 utilizes federated learning using multiple sub-engines to collaboratively train the LLM in a manner where user input and data remains decentralized versus centrally stored.

In another embodiment, the LLM engine 220 utilizes a public LLM which is trained on data that is publicly available on the Internet and/or social media platforms, and which is not limited to data stored in the datastores 201.

In yet another embodiment, the LLM engine 220 utilizes both a private LLM and a public LLM to perform the various functions described herein of the website generator platform 102.

In an embodiment, when a description is input by the user, the LLM engine 220 generates a structure for a website, which can include, for example, a theme, a color scheme and/or palette, font(s), and font size(s) to be used, a structure and layout of elements, and the like. In addition, the LLM engine 220 generates various content for the website, such as, for example, text, copy, images, video, animations, other multimedia, forms (i.e., text input fields, button selectors, dropdown fields, etc.), and the like.

Regarding the business-specific content based on the input description, the LLM engine 220 generates product or service information and descriptions, operating hours and schedules, menus, product catalogs, and the like. In addition, the LLM engine 220 can generate product images and videos, instructional content, frequently asked questions ("FAQ") content, educational content, informational content, and the like.

Thus, the functions of the NLP engine 206, internet scanning engine 208, template generation engine 210, content generation engine 214, and/or the social media scanning engine 216 can be wholly, or in-part, performed by the LLM engine 220.

In yet another embodiment, the LLM engine 220 can provide a chat-like feature to the user, thereby performing functions of the intake engine 204. In this embodiment, the LLM engine 220 can leverage an interface which performs text and/or voice based prompting and responding, similar to the functionality of ChatGPT, a chatbot developed by OpenAI, Inc.

Figure 3:
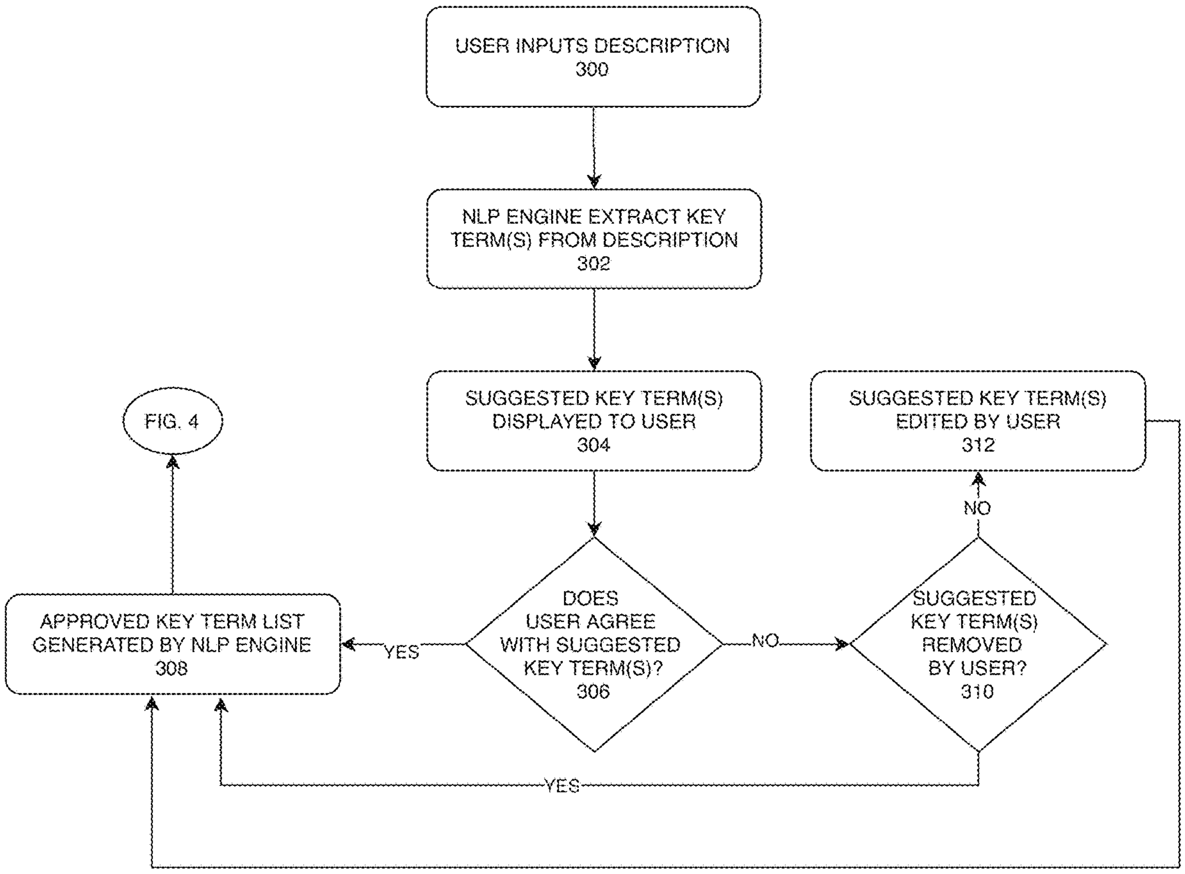
FIG. 3 is a flowchart depicting the steps of extracting key terms from a description input by a user, according to an embodiment of the present invention.

FIG. 3 is a flowchart depicting the steps of extracting key terms from a description input by a user, according to an embodiment of the present invention. At step 300, the user inputs a description using their user computing device 104, as described herein. At step 302, the NLP engine 206 processes the description text string to extract key terms, as described herein. At step 304, the extracted key terms are displayed to the user computing device 104 as suggestions for the user to review. In an embodiment, the NLP engine 206 can extract a single key term, or multiple key terms, from the description.

As step 306, if the user agrees with all of the suggested key terms, then the suggested key terms are added to the approved key term list by the NLP engine 206 as step 308. However, if the user does not agree with at least one of the suggested key terms, then the user can remove the particular suggested key term at step 310, and the remaining suggested key terms are then used to generate the approved key term list at step 308 by the NLP engine 206.

However, if the user wishes to edit at least one suggested key term, instead of removing it, then the user can edit the particular suggested key term, and then the edited suggested key terms are then used to generate the approved key term list at step 308 by the NLP engine 206. The process then continues to the steps described with reference to FIG. 4.

Figure 4:
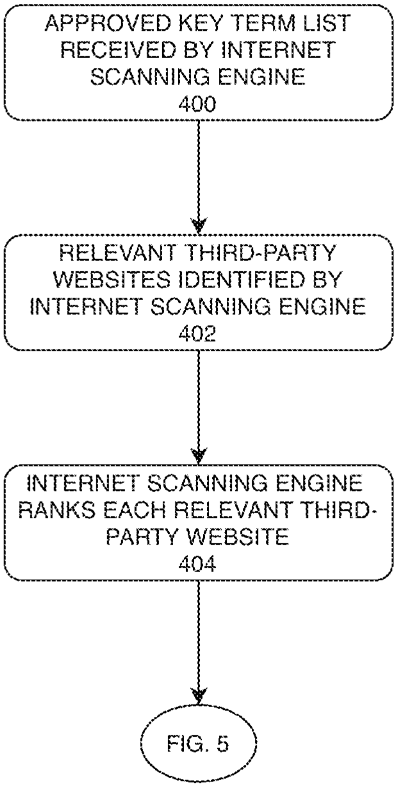
FIG. 4 is a flowchart depicting the steps of scanning the Internet using an approved key term list, according to an embodiment of the present invention.

FIG. 4 is a flowchart depicting the steps of scanning the Internet using an approved key term list, according to an embodiment of the present invention. At step 400, the approved key term list generated by the NLP engine at step 308 is received by the Internet scanning engine 208. At step 402, the Internet scanning engine 208 performs keyword-based searching against text, copy, content, headers, descriptors, and tags of third-party websites to identify websites relevant to the user's business or organization. In addition, the Internet scanning engine 208 searches source code, such as HTML code and metadata, of third-party websites to identify relevant websites matching the approved key term list, or including key terms in the approved key term list, as described herein.

Next, as step 404, the Internet scanning engine 208 ranks each potentially relevant third-party website using the matching algorithm and/or the traffic data algorithm, so that a weighted analysis can be performed, as described herein.

Figure 5:
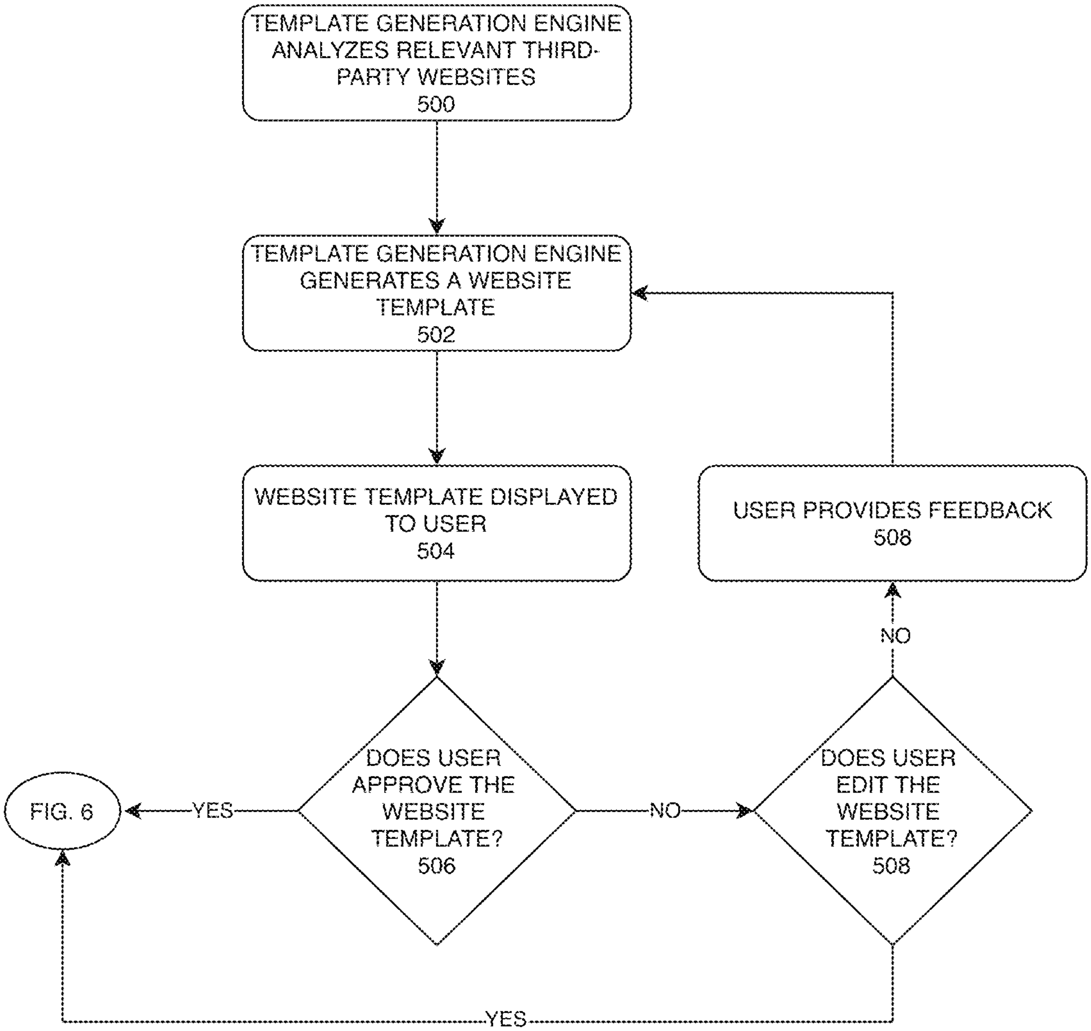
FIG. 5 is a flowchart depicting the steps of generating a website template, according to an embodiment of the present invention.

The process then continues to steps described with reference to FIG. 5. FIG. 5 is a flowchart depicting the steps of generating a website template, according to an embodiment of the present invention. At step 500, the template generation engine 210 analyzes each relevant third-party website for various template information, such as, but not limited to, the types of pages, the type of content on each page, the context of the content, what the content depicts, the color scheme and/or palette, the font(s) and font size(s) used, the structure and layout of elements, and/or the presence or absence of social media content, as described herein.

At step 502, the template generation engine 210 generates a website template based on the template information determined the relevant third-party websites, as described herein. At step 504, the template generation engine 210 displays the website template on the user computing device 104 for the user to review. If the user does not approve the website template at step 506, then the user can edit the website template at step 508, and the process continues to the steps described with reference to FIG. 6.

However, if at step 508, the user does not wish to edit the website template, but instead elects to reject the website template, then at step 508, the template generation engine 210 can prompt the user to provide feedback about why the website template was rejected. The process then continues to step 502, where the template generation engine 210 can then generate another website template by considering the user feedback.

However, if at step 506 the user approves the website template, then the process continues to the steps described with reference to FIG. 6.

Figure 6:
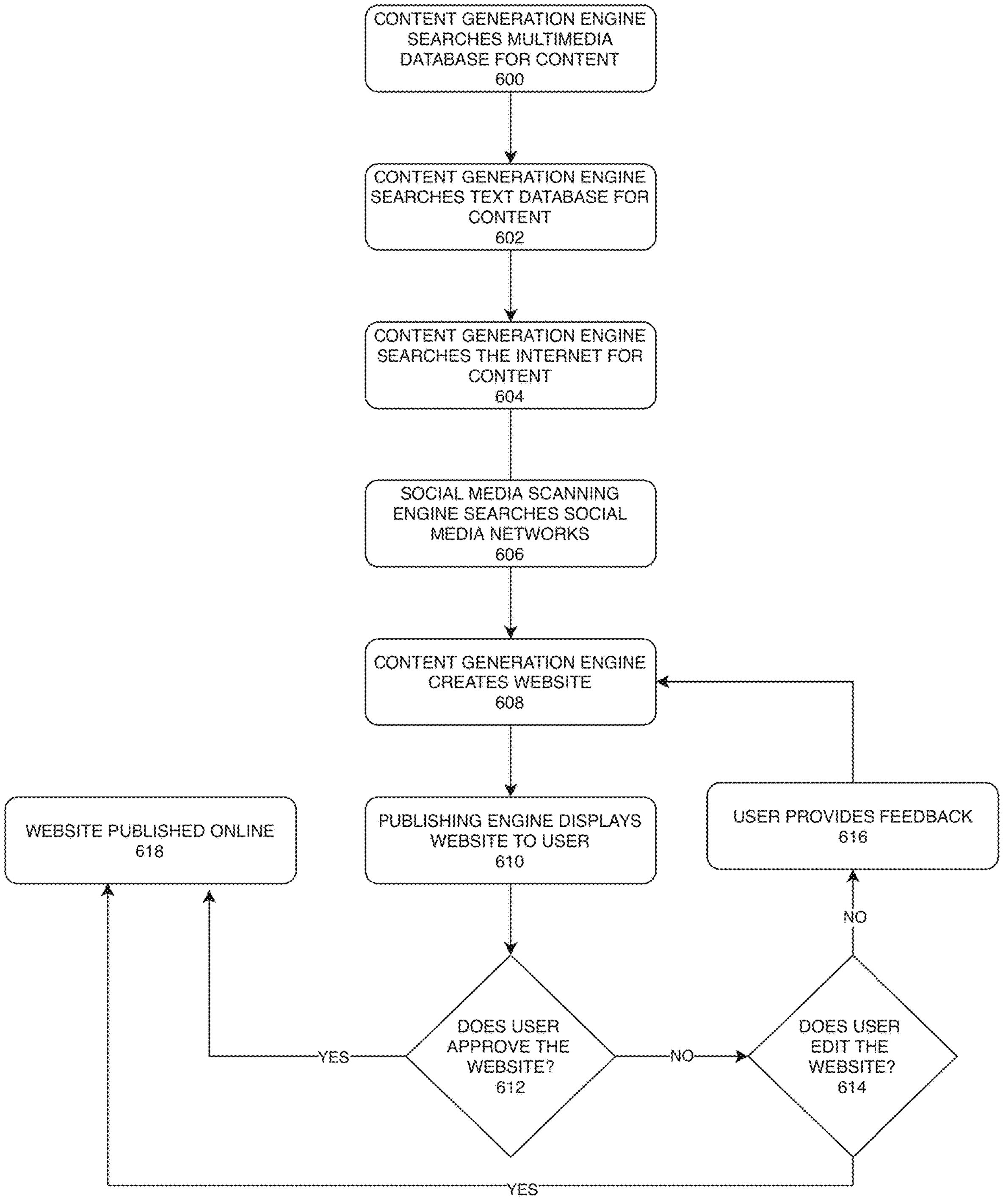
FIG. 6 is a flowchart depicting the steps of generating a website using the website template, according to an embodiment of the present invention.

FIG. 6 is a flowchart depicting the steps of generating a website using the website template, according to an embodiment of the present invention. At step 600, the content generation engine 214 searches the multimedia database 232 to identify multimedia content that matches the multimedia content found on the relevant third-party websites identified by the Internet scanning engine 208, as described herein.

At step 602, the content generation engine 214 searches the text database 234 to identify text content that matches the text content found on the relevant third-party websites identified by the Internet scanning engine 208, as described herein.

At 604, the content generation engine 214 searches the Internet to identify multimedia content and text content which is similar to, but not identical to, the multimedia content and text content found on the relevant third-party websites identified by the Internet scanning engine 208, as described herein.

At 606, the social media scanning engine 216 searches various social media networks to identify social media content and profiles relevant to the user's business or organization, as described herein.

At step 608, the content generation engine 214 creates a website using the identified multimedia content, text content, and/or social media content, as described herein. At step 610, the publishing engine 218 displays the website on the user computing device 104 for the user to review. If the user does not approve the website template at step 612, then the user can edit the website template at step 614, and the process continues to step 618 where the publishing engine 218 publishes the website online, such as onto the Internet.

However, if at step 614, the user does not wish to edit the website, but instead elects to reject the website, then at step 616, the content generation engine 214 can prompt the user to provide feedback about why the website was rejected. The process then continues to step 608, where the content generation engine 214 can then generate another website by considering the user feedback.

However, if at step 612 the user approves the website template, then the process continues to step 618 where the publishing engine 218 publishes the website online, such as onto the Internet.

In an embodiment, the website generator platform 102 allows the user to edit the website at any time using the editing engine 212 after the website has been published.

The following are various additional content and related assets that can be created by the website generator platform 102 after the website has been generated. The additional content and related assets can be created by the artificial intelligence engine 200 utilizing generative AI, and the LLM engine 220.

Marketing Content Related to the Generated Website

In an embodiment, the LLM engine 220 can generate various marketing materials (i.e., marketing assets) related to content on the website and/or the products and services offered for sale on the website. For example, the LLM engine 220 can generate social media posts, online advertisements, and the like, as well as copy and content for print ads for physical magazines, publications, flyers, brochures, billboards, and other physical signage.

In an embodiment, the online advertisements can include pay-per-click advertisements, display and banner advertisements, pop-up advertisements, social media advertisements, and the like. The LLM engine 220 can further generate metatags and keywords for the online advertisement it generates, as well as generate marketing campaigns with tailored content to various different targeted audiences (i.e., millennials, fitness enthusiasts, active senior citizens, "weekend warriors", and like).

For example, for a website selling running shoes, the LLM engine 220 can create a marketing campaign geared towards fitness enthusiasts, and generate multimedia such as images and videos depicting athletes performing while wearing the merchant's shoes, and can further identify targeted audiences across various social media platforms where the specific marketing campaign should be deployed.

In another example, the LLM engine 220 can create another marketing campaign geared towards active senior citizens, and generate multimedia such as image and video content depicted older persons walking, running, and engaging in various physical activity while wearing the merchant's shoes, and can identify the relevant targeted audiences across various social media platforms and Internet locations where this specific marketing campaign should be deployed.

Thus, the LLM engine 220 can identify multiple, different targeted audiences for the website, and generate different marketing campaigns directed toward each different targeted audience.

Sales Content and Campaigns Related to the Generated Website

In an embodiment, the LLM engine 220 can generate copy and content for sales messages, such as e-mails, direct messages, chat messages, social media messages, and the like (collectively, "Sales Messages"), related to content on the website and/or the products and services offered for sale on the website. In addition, the LLM engine 220 can identify potential sales leads to which the Sales Message will be sent based the content on the website and/or the products and services offered for sale on the website. In an embodiment, the LLM engine 220 can leveraging public data on the Internet and/or social media platforms to identify, for example, relevant e-mail addresses, social media handles, and the like. In another embodiment, the LLM engine 220 can leverage private customer data, such as a customer database or a customer relationship management ("CRM") system managed by the merchant, in order to identify potential leads for the sales e-mails and social media handles In an embodiment, the LLM engine 220 can access social media platforms via an API to obtain social media handles and other demographic, social, and preference data related to social media users, in order to determine whether such users should be identified as potential sales leads.

In another embodiment, the LLM engine 220 can generate text scripts and sales pitches for human agents who may place telephone calls to potential customers or leads. In yet another embodiment, the LLM engine 220 generates text scripts which are used by automated calling systems which place autodialed telephone calls to potential customers and delivers a pre-recorded message in an artificial or simulated voice.

Service and Customer Support for the Generated Website

In an embodiment, the LLM engine 220 can perform chat-based customer service functions by receiving text and/or voice based questions from customers, and providing responses or answers in a conversational format, similar to ChatGPT. In an embodiment, the content generation engine 214 can insert a chat feature on the website, whereby the chat feature leverages the LLM engine 200. For example, the LLM engine 220 can provide responses and answers to product related questions in real-time, or near real-time, such as what sizes and colors particular products come in, what the estimated delivery time is based on the customer's location, what the website/merchant's return policy is, when a particular out-of-stock item will be back in stock, what the most popular items sold on the website are, and the like. In an embodiment, the LLM engine 220 analyzes the content on the website to provide answers to product related questions.

In addition, the LLM engine 220 can also provide responses to order-related questions in real-time, or near real-time, such as the status of an order, the location of a shipment, a return status, a refund status, and the like. In this embodiment, the LLM engine 220 can leverage the merchant's CRM system, order fulfillment system, and/or e-commerce system to obtain answers and responses to the order-related questions.

In an embodiment, the LLM engine 220 stores queries and responses over time, such that prior queries and responses are used to train the LLM engine 220 in order to provide more efficient, accurate, and precise responses over time.

In an embodiment, the LLM engine 220 can analyze a customer's interaction with the generated website (i.e., navigation and/or navigation history through various pages, product listings, etc., the time spent of specific portions of the generated website or product listings, items added to or removed from a shopping cart, and the like) in order to further generate a more precise, tailored, or relevant response to the user's question.

In yet another embodiment, the LLM engine 220 can generate suggested answers, responses, and replies for human customer service agents who are performing the chat service with the customer.

Branding Related to the Generated Website

In an embodiment, the LLM engine 220 can automatically generate branding assets, such as a logo related to the generated website, and insert, or suggest a placement location of, the logo in collaboration platform, such as Google® Workspace, related to the domain of the generated website. For example, the LLM engine 220 can insert the logo into e-mail signatures, video chat meeting rooms, calendar invitations, and the like.

Other types of branding assets generated by the LLM engine 220 based on the content and/or multimedia on the generated website include, but is not limited to, typography, slogans and taglines, color palettes, brand guidelines, e-mail signatures, and product packaging.

In an embodiment, the branding asset is a social media kit, which includes, for example, logos, color palettes, hashtags, images and graphics, where the social media kit is used to provide consistent and effective messaging and branding across various social media channels.

In an embodiment, the LLM engine 220 identifies previously generated branding assets which may be related to the content on the website and/or the products and services offered for sale on the website, or related to the website's industry or business type. The user is presented with these previously generated branding assets, and can select any of the previously generated branding assets which they like, or which they would like the LLM engine 220 to use as inspiration for their own branding assets. The LLM engine 220 then utilizes the selected previously generated branding assets as part of its input when generating the user's branding assets.

Domain Name Suggestions Related to the Generated Website

In an embodiment, the LLM engine 220 can identify and suggest domain names and extensions related to the content on the generated website. For example, if a user does not yet have a domain name where the generated website will be hosted, the LLM engine 220 can analyze domain registrar databases to identify domain name which are available (i.e., unregistered), soon-to-be available (i.e., expiring), and/or for-sale by private sellers, and which relevant to the generated website. In an embodiment, the LLM engine 220 can query domain registrar databases via API(s).

In an embodiment, the LLM engine 220 can provide a list of suggested domain names for the user to select from. In this embodiment, the LLM engine 220 can rank the list of suggested domain names by, for example, domain authority, search engine optimization value, popularity, value, traffic ranking, and the like.

In another embodiment, if the user has a domain name for to the generated website, the LLM engine 220 can analyze other potential domain names and suggest other available domain names which may have a higher domain authority, search engine optimization value, popularity, value, traffic ranking, and the like.

In an embodiment, the user can input specific domain name parameters that the LLM engine 220 can utilize when identifying and suggesting domain names. For example, the user can select preferred domain extensions (i.e., only.com or.net, or only.ai or.io, etc.), specify terms, keywords, character strings, and/or characters that must be included or excluded in the domain name, and specify a maximum and/or minimum length of the domain name. The LLM engine 220 can suggest only those domain names which conform to the domain name parameters input by the user.

Business Formation Related to the Generated Website

In an embodiment, the LLM engine 220 can analyze the content, such as the goods, products, and/or services included in the copy and/or multimedia of the generated website to determine the type of business (i.e., law firm, restaurant, apparel seller, etc.) to suggest an appropriate entity type for the underlying business of the website (i.e., corporation, limited liability company, not-for-profit organization, professional corporation, partnership, sole proprietorship, etc.), as well as an appropriate jurisdiction for forming the entity. For example, the LLM engine 220 can analyze the business address provided on the website to determine an appropriate jurisdiction, and can analyze the goods and/or services offered to determine an appropriate entity type which is legally recognized within the jurisdiction.

In an embodiment, based on the jurisdiction, the type of business, the goods and/or services offered, the LLM engine determines at least one of an operational complexity of the business, a liability exposure, a tax liability, and capital investment structuring when determining an appropriate entity type for the underlying business of the website.

Insurance Recommendation Related to the Generated Website

In an embodiment, the LLM engine 220 can analyze the content of the generated website to determine the type of business as well as the types of goods and/or services offered to recommend an insurance product, and specifically, an optimal type and amount of insurance coverage for the business underlying the website. For example, if the generated website offers legal services across multiple states, the LLM engine 220 may recommend a multi-jurisdictional legal malpractice insurance in addition to general liability insurance, whereas if the generated website is an e-commerce store for clothing, the LLM engine 220 may recommend general liability insurance and product liability insurance.

In an embodiment, the recommended insurance product can be selected from a group consisting of, but not limited to, professional liability insurance, product liability insurance, commercial property insurance, cyber insurance, business interruption insurance, workers' compensation insurance, general liability insurance, vehicle insurance, commercial umbrella insurance, key person insurance, business income insurance, data breach insurance, catering insurance, medical malpractice insurance, legal malpractice insurance, and employment practices liability insurance, for example.

In an embodiment, the LLM engine 220 can leverage public information from the Internet related to third-party insurance providers, as well as leverage APIs with insurance providers and/or insurance brokerages which the website generator platform 102 may have a preferred relationship with, in order to provide insurance recommendations.

While the principles of the present invention have been illustrated in relation to the exemplary embodiments shown herein, the principles of the disclosure are not limited thereto and include any modification, variation, or permutation thereof.

The invention claimed is:

1. A system for automatically generating a website and providing conversational chat-based customer service, comprising:

a server including one or more processors;

a memory coupled to the server, the memory storing instructions that, when executed by the one or more processors, cause the system to perform:

receiving a description of a business or an organization from a user computing device by an intake engine coupled to the server, wherein the description is limited to no more than 200 characters;

analyzing the description by a natural language processing engine coupled to the server to extract a plurality of terms from the description;

for each of the plurality of terms, determining if the term is stored in a corpus coupled to the memory, wherein if the term is stored in the corpus, then the term is placed in a key term list;

searching the Internet by an Internet scanning engine coupled to the server to identify websites that include at least 75% of the terms in the key term list, wherein the Internet scanning engine identifies websites by searching for the terms in the key term list in a source code of the websites;

ranking the identified websites using a traffic data algorithm, wherein websites having higher traffic are assigned a higher rank;

generating the website by a template generation engine coupled to the server, the website generated based on a weighted analysis of the ranked identified websites;

inserting copy and multimedia related to content on the ranked identified websites into the website by a content generation engine coupled to the server; and inserting a chat feature into the website, wherein a large language model ("LLM") engine coupled to the server generates responses to queries entered into the chat feature.

2. The system of claim 1, wherein the corpus is updated over time by the natural language processing engine.

3. The system of claim 1, wherein the queries are product-related queries.

4. The system of claim 3, wherein the LLM engine generates responses to product-related queries by analyzing at least one of the copy and the multimedia.

5. The system of claim 1, wherein the queries are order-related queries.

6. The system of claim 5, wherein the LLM engine generates responses to order-related queries by analyzing an order fulfillment system coupled to the server.

7. The system of claim 1, wherein the LLM engine generates responses to queries which are provided to the chat feature in real-time.

8. The system of claim 1, wherein the LLM engine is trained using the queries and responses.

9. A system for automatically generating a website and providing conversational chat-based customer service, comprising:

a server including one or more processors;

a memory coupled to the server, the memory storing instructions that, when executed by the one or more processors, cause the system to perform:

receiving a description of a business or an organization from a user computing device by an intake engine coupled to the server, wherein the description is limited to 200 characters;

analyzing the description by a natural language processing engine coupled to the server to extract a plurality of terms from the description;

for each of the plurality of terms, determining if the term is stored in a corpus coupled to the memory, wherein if the term is stored in the corpus, then the term is placed in a key term list;

searching the Internet by an Internet scanning engine coupled to the server to identify websites that include a threshold percentage of the terms in the key term list, wherein the Internet scanning engine identifies websites by searching for the terms in the key term list in a source code of the websites;

ranking the identified websites using a traffic data algorithm, wherein websites having higher traffic are assigned a higher rank;

generating the website by a template generation engine coupled to the server, the website generated based on a weighted analysis of the ranked identified websites;

inserting copy and multimedia related to content on the ranked identified websites into the website by a content generation engine coupled to the server; and inserting a chat feature into the website, wherein a large language model ("LLM") engine coupled to the server generates responses to queries entered into the chat feature by the user computing device, wherein the responses are generated based at least in part on an interaction by the user computing device with the website.

10. The system of claim 9, wherein the corpus is updated over time by the natural language processing engine.

11. The system of claim 9, wherein the queries are product-related queries.

12. The system of claim 11, wherein the LLM engine generates responses to product-related queries by analyzing at least one of the content and the multimedia.

13. The system of claim 9, wherein the queries are order-related queries.

14. The system of claim 13, wherein the LLM engine generates responses to order-related queries by analyzing an order fulfillment system coupled to the server.

15. The system of claim 9, wherein the LLM engine is trained using the queries and responses.

16. A system for automatically generating a website and providing conversational chat-based customer service, comprising:

a server including one or more processors;

a memory coupled to the server, the memory storing instructions that, when executed by the one or more processors, cause the system to perform:

receiving a description of a business or an organization from a user computing device by an intake engine coupled to the server, wherein the description is limited to 200 characters;

analyzing the description by a natural language processing engine coupled to the server to extract a plurality of terms from the description;

for each of the plurality of terms, determining if the term is stored in a corpus coupled to the memory, wherein if the term is stored in the corpus, then the term is placed in a key term list;

searching the Internet by an Internet scanning engine coupled to the server to identify websites that include a threshold percentage of the terms in the key term list, wherein the Internet scanning engine identifies websites by searching for the terms in the key term list in a source code of the websites;

ranking the identified websites using a traffic data algorithm, wherein websites having higher traffic are assigned a higher rank;

generating the website by a template generation engine coupled to the server, the website generated based on a weighted analysis of the ranked identified websites;

inserting copy and multimedia related to content on the ranked identified websites into the website by a content generation engine coupled to the server; and inserting a chat feature into the website, wherein a large language model ("LLM") engine coupled to the server generates responses to queries entered into the chat feature by a user computing device, wherein the responses are generated based at least in part on a navigation history of the user computing device on the website.

17. The system of claim 16, wherein the corpus is updated over time by the natural language processing engine.

18. The system of claim 16, wherein the queries are product-related queries.

19. The system of claim 16, wherein the queries are order-related queries.

20. The system of claim 16, wherein the LLM engine is trained using the queries and responses.

* * * * *